(12) United States Patent
Proctor

(10) Patent No.: US 10,802,665 B2
(45) Date of Patent: Oct. 13, 2020

(54) SYSTEM AND METHOD FOR PROJECTING GRAPHICAL OBJECTS

(71) Applicant: MOTOROLA SOLUTIONS, INC, Chicago, IL (US)

(72) Inventor: Lee M Proctor, Cary, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 196 days.

(21) Appl. No.: 15/285,528

(22) Filed: Oct. 5, 2016

(65) Prior Publication Data

US 2018/0095607 A1 Apr. 5, 2018

(51) Int. Cl.
| | |
|---|---|
| G06F 3/00 | (2006.01) |
| G06F 3/0481 | (2013.01) |
| G06T 17/05 | (2011.01) |
| G06F 3/01 | (2006.01) |
| G09F 27/00 | (2006.01) |

(Continued)

(52) U.S. Cl.
CPC .......... G06F 3/04815 (2013.01); G06F 3/011 (2013.01); G06F 3/0482 (2013.01); G06T 17/05 (2013.01); G06T 19/006 (2013.01); G09F 19/18 (2013.01); G09F 19/226 (2013.01); G09F 27/004 (2013.01)

(58) Field of Classification Search
CPC .... G06F 3/0482; G06F 3/011; G06F 3/04815; G09F 19/22; G09F 19/18; G09F 19/12
See application file for complete search history.

(56) References Cited

U.S. PATENT DOCUMENTS

| | | | |
|---|---|---|---|
| 4,951,151 A | * | 8/1990 | Sorenson .................. H04N 5/74 348/52 |
| 6,150,943 A | | 11/2000 | Lehman et al. |

(Continued)

FOREIGN PATENT DOCUMENTS

| | | |
|---|---|---|
| DE | 29716598 U1 | 3/1998 |
| DE | 102011080339 A1 | 2/2013 |

OTHER PUBLICATIONS

Krum, David M. et al.: "Augmented Reality using Personal Projection and Retroreflection", Journal Personal and Ubiquitous Computing, vol. 16 Issue 1, Jan. 2012, Springer-Verlag London, UK, pp. 17-26.

(Continued)

*Primary Examiner* — Keith D Bloomquist
(74) *Attorney, Agent, or Firm* — Raguraman Kumaresan

(57) ABSTRACT

Systems and methods of projecting graphical objects are disclosed. In one example, a system includes a virtual reality (VR) rendering engine configured to generate a virtual reality space of a geographic region of interest with a graphical feature that represents a physical feature in the geographic region of interest. A display is configured to display a VR graphical user interface (GUI) with the generated virtual reality space and a menu including graphical objects. A graphical object may be placed on the graphical feature in the virtual reality space. A projector interface determines a projection surface on the physical feature based on the placement of the graphical object in the virtual reality space and generates instructions for a projector to project an image of the graphical object onto the projection surface in the physical feature of the geographic region of interest.

18 Claims, 11 Drawing Sheets

(51) Int. Cl.
   *G09F 19/22* (2006.01)
   *G09F 19/18* (2006.01)
   *G06F 3/0482* (2013.01)
   *G06T 19/00* (2011.01)

(56) References Cited

U.S. PATENT DOCUMENTS

| | | | |
|---|---|---|---|
| 6,937,210 B1* | 8/2005 | MacDonald | A63J 25/00 |
| | | | 345/1.1 |
| 7,511,684 B2 | 3/2009 | Oliver et al. | |
| 7,973,786 B2 | 7/2011 | Gyorfi et al. | |
| 8,339,394 B1* | 12/2012 | Lininger | G06T 15/04 |
| | | | 345/419 |
| 8,825,225 B1 | 9/2014 | Stark | |
| 9,704,361 B1* | 7/2017 | Hazlewood | G05B 15/02 |
| 2007/0258016 A1* | 11/2007 | Galligan | G03B 21/16 |
| | | | 348/744 |
| 2009/0054084 A1 | 2/2009 | Buhrke et al. | |
| 2010/0313146 A1* | 12/2010 | Nielsen | G06F 3/0481 |
| | | | 715/757 |
| 2011/0267179 A1 | 11/2011 | Patterson | |
| 2012/0322568 A1* | 12/2012 | Lindeman | G09B 19/0038 |
| | | | 473/156 |
| 2014/0002440 A1* | 1/2014 | Lynch | G06T 19/00 |
| | | | 345/419 |
| 2014/0167954 A1* | 6/2014 | Johnson | H04W 76/10 |
| | | | 340/539.11 |
| 2014/0313225 A1 | 10/2014 | Lee et al. | |
| 2015/0206419 A1* | 7/2015 | Johnson | G08B 25/009 |
| | | | 340/936 |
| 2016/0041628 A1 | 2/2016 | Verma | |
| 2016/0093078 A1* | 3/2016 | Davis | G06F 16/58 |
| | | | 345/629 |
| 2016/0284256 A1 | 9/2016 | Wigell | |

OTHER PUBLICATIONS

The International Search Report and the Written Opinion corresponding patent application No. PCT/US2017/053159 filed Sep. 25, 2017, dated Nov. 29, 2017, all pages.

* cited by examiner

SYSTEM AND METHOD FOR PROJECTING GRAPHICAL OBJECTS

BACKGROUND

For a variety of events or situations, such as sporting events, celebrations, parties, or merely congested urban areas, large amounts of people may congregate and generate a crowd. For such crowds, it is important to maintain order, such as via law-enforcement for public safety concerns. However, the more people that are in a crowded area, and the more confined the area, the more difficult it may be to disperse people in an orderly manner. Such order may be even more difficult to maintain in moments of crisis. This is particularly true in urban areas in which visibility may be impeded by buildings, vehicles, or other people that are densely gathered. Law enforcement is often present to direct people into and out of crowded areas, but the limited visibility of law enforcement and/or people in the crowded area may cause confusion and/or delays. Additionally, emergency responders that are dispatched to crowded areas may be delayed by crowds, and may thus have to rely on verbal directions from a dispatcher or other central source. Accordingly, there is a need for systems and methods for providing public safety information.

Figure 1:
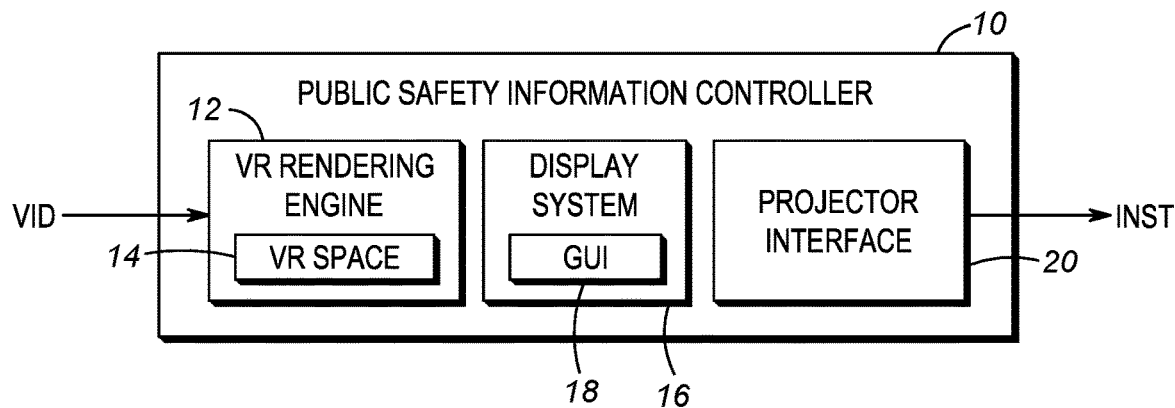
FIG. 1 illustrates an example of a public safety information controller in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein

DETAILED DESCRIPTION OF THE INVENTION

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

One example includes a method and system for projecting graphical objects. The system includes a virtual reality (VR) rendering engine configured to generate a virtual reality space of a geographic region of interest with a graphical feature that represents a physical feature of the geographic region of interest. The system also includes a display configured to display a virtual reality graphical user interface (GUI) with the generated virtual reality space and a menu including graphical objects. The system also includes an electronic processor that detects an input indicative of a placement of a graphical object in the virtual reality space. The system further includes a projector interface that determines a projection surface on the physical feature of the geographic region of interest based on the placement of the graphical objects in the virtual reality space and generates instructions for a projector to project an image of the graphical object onto the determined projection surface in the physical feature of the geographic region of interest.

FIG. 1 illustrates an example of a public safety information controller 10 in accordance with some embodiments. The public safety information controller 10 may be implemented in a variety of contexts to provide public safety information to people in a crowd and/or to emergency responders in a crowded and/or urban environment. As described herein, the public safety information controller 10 may generate a virtual reality (VR) space corresponding to a geographic region of interest and to allow user interaction with the virtual reality space that corresponds to the geographic region of interest. The public safety information controller 10 may facilitate the laser projection of the public safety information on one or more physical features of the geographic region of interest based on the user interaction to disseminate the public safety information to the people in the crowd and/or the emergency responders. The public safety information controller 10 may be used for a variety of public safety applications, such as to provide crowd control for evacuation, to display detours for public through-ways, and/or to provide instructions or direction to emergency responders. As an example, the public safety information controller 10 may be located at a public safety vehicle, such as a law-enforcement vehicle, or may be located at a dispatch center or in a central dispatch vehicle.

The public safety information controller 10 includes a virtual reality rendering engine 12 that is configured to generate a virtual reality space 14 of the geographic region of interest. The geographic region of interest may correspond to any geographic region occupied by people to whom the public safety information is to be visually conveyed, such as including one or more streets, intersections, city squares or blocks, public gathering sites, or the like. As described herein, the geographic region of interest includes at least one physical feature that corresponds to a location on which the public safety information is to be projected, such as a building, a hillside, a street surface, or any other façade that is clearly visual to people that occupy the geographic region of interest. In the example of FIG. 1, the virtual reality rendering engine 12 receives video image data (VID) of the geographic region of interest, and generates the virtual reality space 14 based on the video image data (VID). It is appreciated that still image data could be provided to the virtual reality rendering engine 12 to generate the virtual reality space 14 based on the still image data. Thus, the virtual reality space 14 may visually represent the geographic region of interest, such that substantially all of the physical features of the geographic region of interest are visually represented in the virtual reality space 14 as respective graphical features. Therefore, the at least one physical feature corresponding to the location on which the public safety information is to be projected is likewise represented as a graphical feature in the virtual reality space 14.

The public safety information controller 10 is configured to display the virtual reality space 14 to a user in a display system 16, and to generate a graphical user interface (GUI) 18 to facilitate user interaction with the virtual reality space 14. As an example, the display system 16 may be implemented as a user-wearable virtual reality interface and display system, such as a goggles and/or a helmet, along with an associated virtual reality input device (e.g., gloves, a handheld controller, a mouse and/or a keyboard, or the like). Alternatively, the display system 16 may be implemented via a computer system, such as a desktop, laptop, or tablet computer system. The graphical user interface 18 may provide one or more menus that may provide the user with a selectable context of public safety, such as corresponding to crowd control, evacuation situations, emergency responses, or other public safety information contexts. Each of the contexts may include an associated menu that provides the capability of user selection of a plurality of graphical objects. The user may thus provide interaction of one or more of the graphical objects with one or more of the graphical features in the virtual reality space 14 via the graphical user interface 18 to display the public safety information corresponding to the graphical object in the geographic region of interest, as described in greater detail herein.

The public safety information controller 10 further includes a projector interface 20. The projector interface 20 may correspond to one or more processing elements and/or software/firmware components that are configured to generate instructions to a projector to display public safety information. For example, the projector interface 20 may generate instructions corresponding to a laser image for projection via a laser projector. The public safety information may correspond to the selected graphical object, such that, in response to the placement of the graphical object over the graphical feature via the graphical user interface 18, the associated projector may project a copy of the graphical object onto the physical feature in the geographic region of interest based on the instructions generated via the projector interface 20. Therefore, the associated projector may output a projected image of the placed graphical object on the physical feature in the geographic region of interest to simulate collocation between the projected image on the physical feature in the geographic region of interest and the placed graphical object on the graphical feature in the virtual reality space.

As described herein, the term "simulated collocation" (and its derivatives) with respect to the graphical object and the projected image indicates that a position of the projected image in the geographic region of interest corresponds to a position in the virtual reality space 14 that represents a same position in the geographic region of interest, and vice versa. In this manner, the projected image and the placed graphical object that have a simulated collocation appear to be at substantially the same position in the virtual reality space 14 and the geographic region of interest. Therefore, the placement of the graphical object on the graphical feature (e.g., a graphical representation of a building) in the virtual reality space 14 via the graphical user interface 18 results in projection of the projected image corresponding to the graphical object onto the physical feature (e.g., the actual building represented by the graphical building) at approximately the same coordinate location. As an example, the virtual reality rendering engine 12 and/or the display system 16 may implement alignment of respective coordinate systems in the virtual reality space 14 and the geographic region of interest and/or a pattern matching algorithm to implement the simulated collocation of the graphical object and the projected image, as described herein.

As a result, the public safety information controller 10 may be implemented to provide a projection (e.g., a laser projection) of public safety information onto a physical feature, such as a building, that is visible to the people in the geographic region of interest. As an example, the public safety information may include evacuation directions and/or instructions, such as arrows, to lead people from a crowded area in an orderly fashion by directing the people to a least congested path of exit (e.g., after a large public gathering or sporting event). As another example, the public safety information may correspond to detour instructions that are visible to drivers in a traffic jam to indicate a preferred route of travel to avoid encountering a previous traffic accident or construction zone. As another example, the public safety information may correspond to instructions or directions to emergency responders, such as by indicating the location of an active shooter, a fire, a safe entry zone, or a variety of other instructions to avoid, mitigate, or prevent danger.

Figure 2:
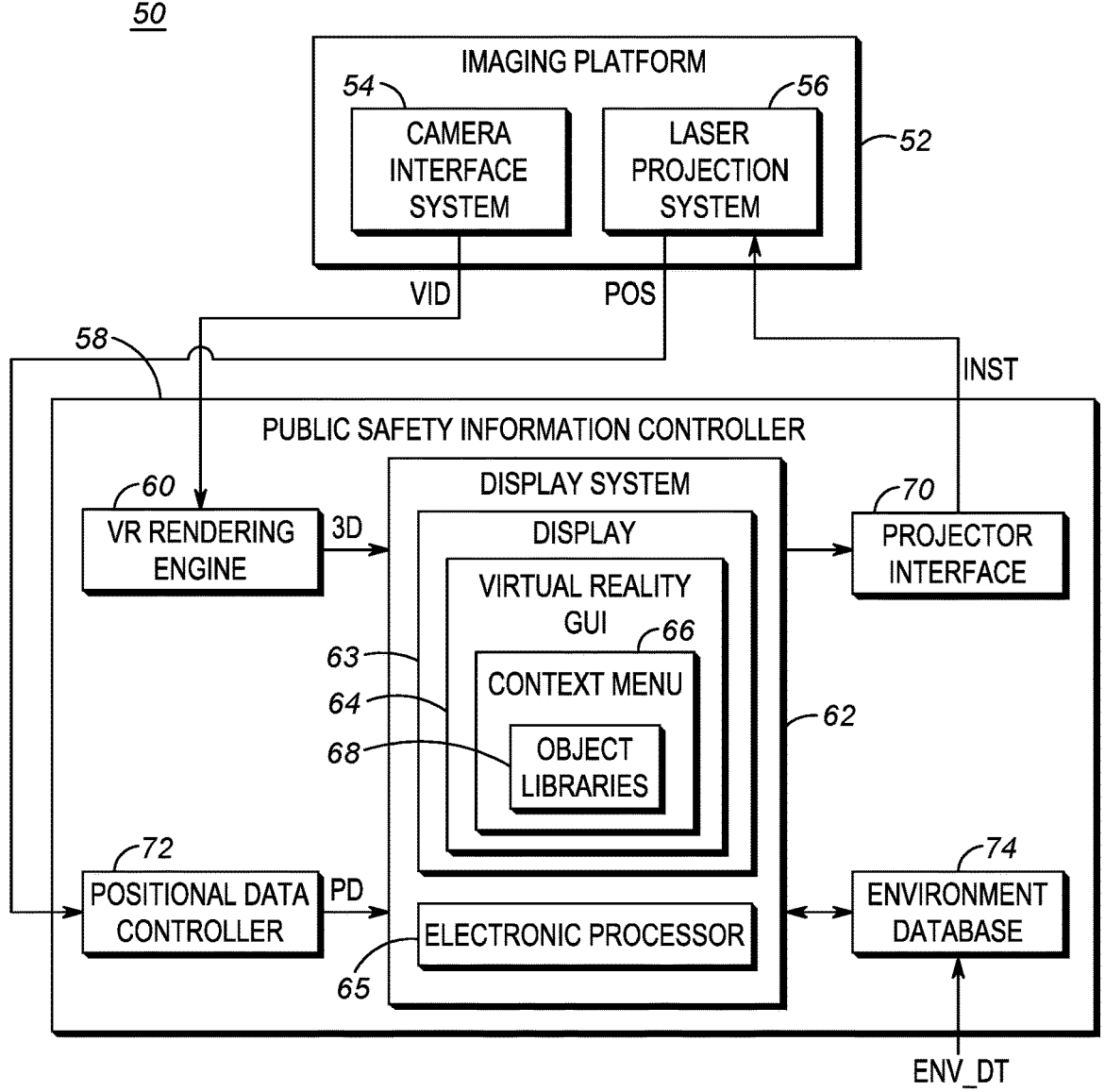
FIG. 2 illustrates an example of a public safety information system in accordance with some embodiments.

FIG. 2 illustrates an example of a public safety information system 50 in accordance with some embodiments. The public safety information system 50 may correspond to the active hardware associated with gathering the video image data VID and providing the public safety information, as well as the processing and computing components associated with the public safety information controller. The public safety information system 50 includes an imaging platform 52. The imaging platform 52 includes a camera interface system 54 and a laser projection system 56. The imaging platform 52 may be mounted on an emergency response or public safety vehicle, such as mounted on a light/siren rack of a law-enforcement vehicle. Thus, the camera interface system 54 and the laser projection system 56 may be substantially collocated, as an example. For example, the camera interface system 54 may be configured as a 360° depth camera interface configured to gather three-dimensional video image data VID in 360° about the imaging platform 52. Alternatively, as described in greater detail herein, the camera interface system 54 and the laser projection system 56 may be mounted in disparate physical locations.

The public safety information system 50 also includes a public safety information controller 58 that may be configured substantially similar to the public safety information controller 10 in the example of FIG. 1. The public safety information controller 58 includes a virtual reality rendering engine 60 that is configured to generate three-dimensional virtual rendering data, demonstrated in the example of FIG. 2 as "3D", corresponding to a virtual reality space of the geographic region of interest (e.g., the virtual reality space 14 in the example of FIG. 1). In the example of FIG. 2, the virtual reality rendering engine 60 receives video image data VID of the geographic region of interest that is obtained via the camera interface system 54, and thus generates the virtual reality space based on the video image data VID. As an example, the virtual reality rendering engine 60 may be configured to provide a direct photo rendering of the video image data VID to convert the image features of the geographic region of interest into corresponding graphical features of the virtual reality space 14. Thus, the virtual reality space may visually correspond to the geographic region of interest, such that substantially all of the physical features of the geographic region of interest are visually represented in the virtual reality space as respective graphical features.

The public safety information controller 58 also includes a display system 62 having a display 63 that is configured to facilitate display of the virtual reality space to a user, and to generate a virtual reality graphical user interface 64 to facilitate user interaction with the virtual reality space. As an example, the display system 62 may be implemented as a user wearable virtual reality interface and display system, such as a goggles and/or a helmet, along with an associated virtual reality input device (e.g., gloves, a handheld controller, a mouse and/or a keyboard, or the like). The virtual reality graphical user interface 64 includes a context menu 66 that may provide the user with a selectable public safety context, such as corresponding to crowd control, disaster evacuation, warnings of danger, emergency response, terrorist threats, or other selectable public safety contexts. Each category of the context menu 66 includes a respective one of one or more object libraries 68 that each provides the capability of user selection of a plurality of graphical objects. The user may select a context via the context menu 66, and may thus select one or more graphical objects from a respective one of the object libraries 68 that is associated with the selected context to be placed on one or more of the graphical features in the virtual reality space via the virtual reality graphical user interface 64. The display system 62 also includes an electronic processor 65 that is configured to detect a user input indicative of a placement of graphical objects in the virtual reality space As another example, the context can be automatically selected based on received context data that corresponds to a variety of context-facilitating factors, such as based on dispatch data that may be indicative of a type of incident, sensor data, or other types of inputs that may provide context prior to initiation of the display system 62. For example, each of the contexts in the context menu 66 may provide reference and access (e.g., via pointers) to a set of graphical objects that are provided in a single object library 68, such that only the set of graphical objects may be seen and accessed by the user in response to selection of the given context from the context menu 66.

The public safety information controller 58 further includes a projector interface 70. The projector interface 70 may correspond to one or more processing elements and/or software/firmware components that are configured to determine a projection surface on the physical feature of the geographic region of interest based on the placement of graphical objects in the virtual reality space. In one embodiment, the projector interface 70 identifies coordinates at which the graphical objects are placed in the virtual reality space. The projector interface 70 determines projection coordinates on the physical feature of the geographic region of interest, where the projection coordinates corresponds to the identified coordinates in the virtual reality space where the graphical objects are placed. The projector interface 70 maps the projection coordinates to the physical feature and identifies a surface on the physical feature that are permissible for the projection of the graphical objects. The projector interface 70 generates instructions, demonstrated in the example of FIG. 2 as a signal INST, to the laser projection system 56 to project the public safety information associated with the graphical object(s) selected from the respective object library 68 onto the projection surface. Therefore, the laser projection system 56 may output a projected image of the placed graphical object on the projection surface in the physical feature of the geographic region of interest to simulate collocation between the projected image on the physical feature in the geographic region of interest and the placed graphical object on the graphical feature in the virtual reality space.

In the example of FIG. 2, the public safety information controller 58 further includes a positional data controller 72. As an example, when the laser projection system 56 is instructed to project the graphical object onto the physical feature (e.g., building) in the geographic region of interest, if the laser projection system 56 is not aligned orthogonally with respect to the surface of the physical feature, the projected image of the graphical object will be distorted, as viewed by observers. Therefore, the positional data controller 72 is configured to monitor a position of the laser projection system 56 in real-time via a signal POS provided from the laser projection system 56 (or directly from the imaging platform 52 on which the laser projection system 56 is mounted). In the example of FIG. 2, the positional data controller 72 may generate positional relationship data PD associated with the position of the laser projection system 56. While the positional data controller 72 is demonstrated as a separate component or element relative to the virtual reality rendering engine 60, it is to be understood that the positional data controller 72 may be integrated as part of the virtual reality rendering engine 60.

In the example of FIG. 2, the positional relationship data PD is provided to the display system 62, such that the display system may ascertain a positional relationship of the laser projection system 56 relative to the graphical features of the virtual reality space based on the three-dimensional virtual reality rendering data 3D from the virtual reality rendering engine 60. Therefore, the positional relationship of the user's view in the virtual reality space relative to the graphical features of the virtual reality space may likewise correspond to a positional relationship between the laser projection system 56 and the physical features of the geographic region of interest based on the common coordinate system between the virtual reality space and the geographic region of interest. Accordingly, the projector interface 70 may be configured to generate the instructions INST for the laser projection system 56 based on the positional relationship data to command the laser projection system 56 to project the projected image at a predetermined orientation on the physical feature irrespective of a position of the laser projection system 56 relative to the surface of the physical feature. In other words, the projection of the graphical object on the surface of the physical feature may be provided as orthogonally centered and non-distorted, as viewed by observers, regardless of the position or orientation of the laser projection system 56 relative to the surface of the physical feature.

As an example, in response to placement of the graphical object on the graphical feature in the virtual reality space, the virtual reality graphical user interface 64 may modify the graphical representation of the graphical object to the user based on the positional relationship data. In this manner, the virtual reality space may be displayed to the user via the virtual reality graphical user interface 64 from a vantage point that simulates collocation of the user in the virtual reality space and the imaging platform 52 in the geographic region of interest. Therefore, the virtual reality graphical user interface 64 may demonstrate the graphical object on the graphical feature as it would appear to the user in the perspective as if the user was in the corresponding physical location in the geographic region of interest (e.g., the physical location of the laser projection system 56). Therefore, the user may view the graphical object in the same manner as the projected image from the orientation of the laser projection system 56 relative to the projection surface in the physical feature, as observed from the physical location of the laser projection system 56. Furthermore, because the positional data controller 72 may monitor the position of the laser projection system 56 in real-time, the positional data controller 72 may facilitate generation of the instructions INST in real-time based on the positional relationship data. As a result, the positional data controller 72 may command the laser projection system 56 to project the projected image at the predetermined orientation on the physical feature irrespective of motion of the laser projection system 56 relative to the projection surface in the physical feature, such as from a moving unmanned aerial vehicle or emergency response vehicle.

In addition, the public safety information controller 58 further includes an environment database 74. The environment database 74 may be configured to store data that defines projection rules associated with laser projection of graphical objects via the laser projection system 56, as constrained by static or dynamic physical or ambient environmental conditions regarding the environment associated with the geographic region of interest. For example, the environment database 74 may store data associated with weather, temperature, and/or ambient light associated with the geographic region of interest. As another example, the environment database 74 may store data associated with the physical features of the geographic region of interest, such as the texture and/or materials associated with the surfaces of the physical features (e.g., brick, stucco, windows, contours, or the like). In the example of FIG. 2, the environment database 74 is demonstrated as receiving an external signal ENV_DT that may correspond to real-time or predetermined updates to the data stored in the environment database 74, such that the projection rules associated with laser projection of graphical objects via the laser projection system 56 may be substantially continuously updated.

In the example of FIG. 2, the display system 62 may be configured to access the environment database 74 based on the selected graphical object that is placed on the respective graphical feature in the virtual reality space, such that the data stored in the environment database 74 may be used to modify the instructions INST generated by the projector interface 70. For example, the environment conditions associated with the geographic region of interest, as stored in the environment database, may affect the laser projection of the graphical object onto the surface of the physical feature in the geographic region of interest. Accordingly, the data stored in the environment database 74 may be implemented to change the laser projection of the graphical object to facilitate better viewing by the observers in the geographic region of interest, such as, for example, by selecting specific colors, projection line thicknesses, or any other manner of modifying the laser projection.

As another example, the projection rules associated with laser projection of graphical objects via the laser projection system 56, as defined by the data stored in the environment database 74, may include projection restrictions. For example, the projection restrictions may be based on known dynamic conditions associated with the geographic region of interest (e.g., flight space of helicopters or other aircraft), or may be based on prohibitive static conditions associated with the physical features of the geographic region of interest. Therefore, the display system 62 may check the environment database 74 to detect whether the placement of the graphical object on the graphical feature, and thus projection of the corresponding projected image onto an identified projection surface of the physical feature, violates the projection rules based on the projection being on an impermissible location in the geographic region of interest. In response to the placement of the graphical object on the graphical feature violating the projection rules, the projector interface 70 may prevent the projection of the projected image onto the identified projection surface on the physical feature via the instructions INST (e.g., provide no instructions). Additionally, the virtual reality graphical user interface 64 may indicate the violation of the projection rules to the user, and may further automatically display the graphical object at a different surface corresponding to a suggested repositioning location in the virtual reality space that does not violate the projection rule. Therefore, the user may accept the suggested repositioning location as the placement of the graphical object, or may select a different graphical feature on which to place the graphical object.

As a result, the public safety information system 50 may be implemented to provide a laser projection of public safety information onto a physical feature, such as a building, that is visual to the people in the geographic region of interest in a variety of ways, as described in greater detail herein with reference to FIGS. 3-9.

Figure 3:
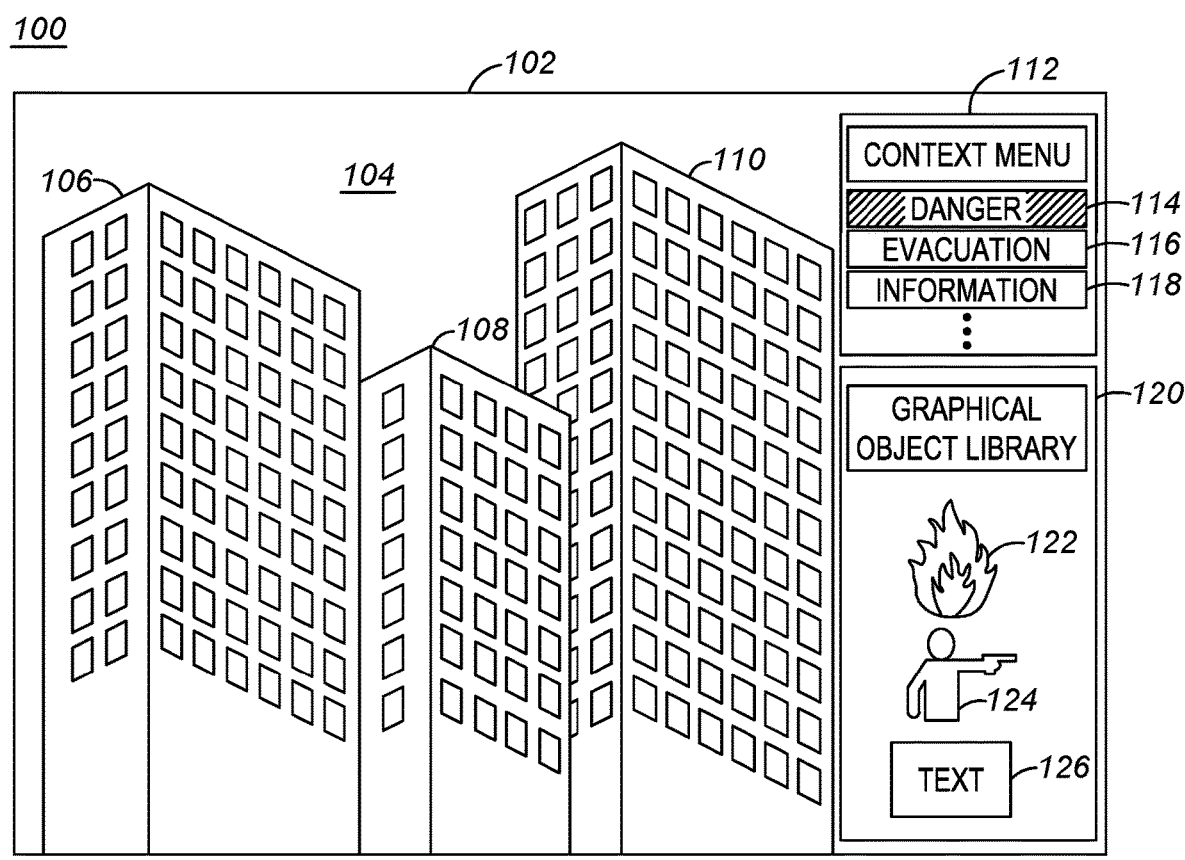
FIG. 3 illustrates an example of a virtual reality graphical user interface in accordance with some embodiments.

FIG. 3 illustrates an example diagram 100 of a virtual reality graphical user interface 102 in accordance with some embodiments. The virtual reality graphical user interface 102 may correspond to the virtual reality graphical user interface 64 in the example of FIG. 2, and may thus correspond to user controls for controlling the public safety information controller 58 in the example of FIG. 2 for projecting the projected image onto the physical feature of the geographic region of interest. Therefore, reference is to be made to the example of FIG. 2 in the following description of the example of FIG. 3.

The virtual reality graphical user interface 102 demonstrates a virtual reality space 104 that could have been generated by the virtual reality rendering engine 60 (e.g., via the camera interface system 54). In the example of FIG. 3, the virtual reality space 104 is demonstrated as a set of three buildings 106, 108, and 110 that may correspond to three respective buildings in the geographic region of interest. The virtual reality graphical user interface 102 also includes a context menu 112. The context menu 112 provides the user with a selectable context of public safety. The context menu 112 demonstrates a danger context 114, an evacuation context 116, an information context 118, and may include additional contexts. The virtual reality graphical user interface 102 also includes a graphical object library 120 that demonstrates a set of graphical objects that may be selected by the user.

In the example of FIG. 3, the danger context 114 is selected. Therefore, in the example of FIG. 3, the graphical object library 120 is populated by graphical objects that correspond to dangerous or hazardous situations, and thus the danger context 114. In the example of FIG. 3, the graphical objects include a fire 122, an active shooter 124, and a text block 126 that may allow the user to program specific text to be projected onto the physical feature via the laser projection system 56. Therefore, as described herein, the user may select a graphical object from the graphical object library 120 and place the graphical object on a graphical feature, such as one of the buildings 106, 108, or 110. In response, the projector interface 70 may generate the instructions INST for the laser projection system 56 to project a laser image corresponding to the placed graphical object onto the physical feature (e.g., one of the respective corresponding physical buildings) in the geographic region of interest, as described herein.

Figure 4:
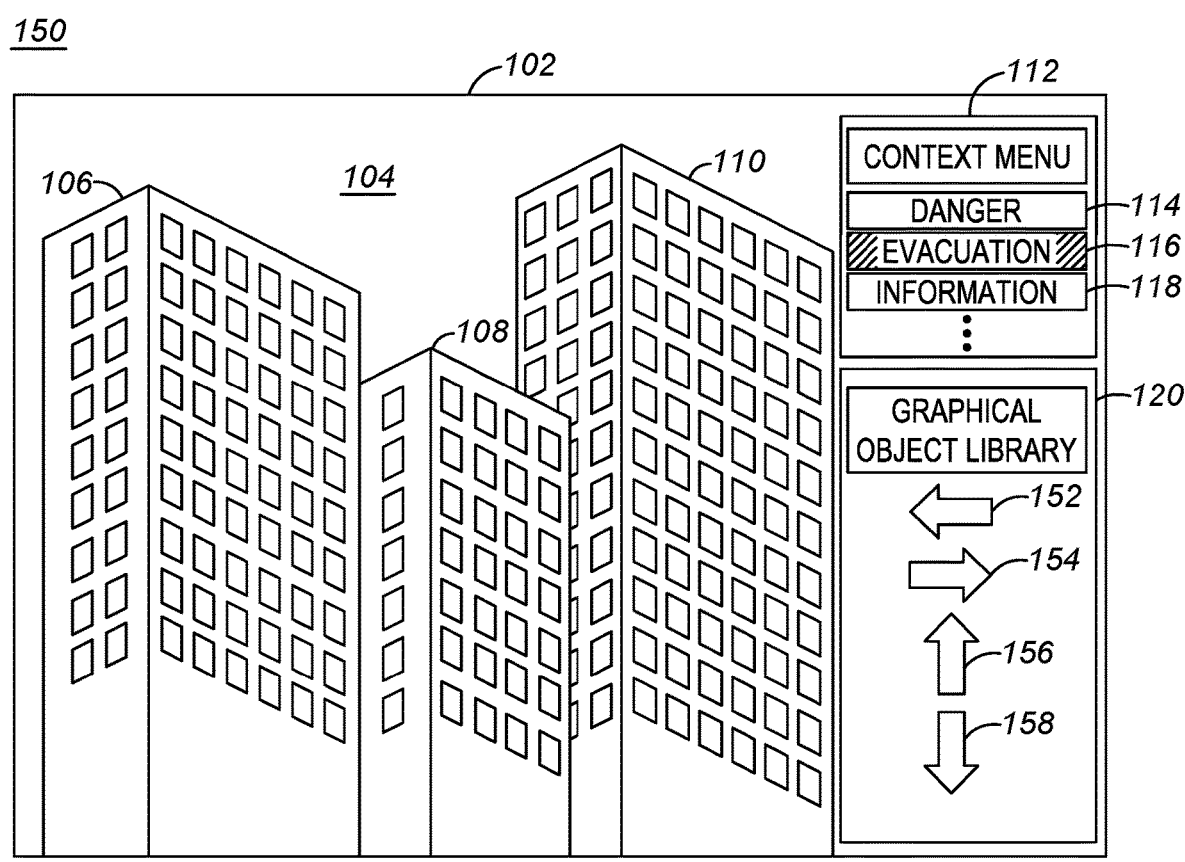
FIG. 4 illustrates another example of a virtual reality graphical user interface in accordance with some embodiments.

FIG. 4 illustrates another example diagram 150 of the virtual reality graphical user interface 102 in accordance with some embodiments. The diagram 150 demonstrates the evacuation context 116 as having been selected by the user, to demonstrate a different example. Therefore, in the example of FIG. 4, the graphical object library 120 is populated by graphical objects that correspond to directions for pedestrians or cars, such as in response to a traffic accident or for crowd control to provide directions for leaving a sporting event in an orderly fashion. In the example of FIG. 4, the graphical objects include a left arrow 152, a right arrow 154, an up arrow 156, and a down arrow 158. As an example, the graphical object library 120 of the evacuation context 116 may include additional graphical objects, such as the text block 126 in the example of FIG. 3 or an accident location sign, a stop sign, a slow sign, and/or a yield sign. Therefore, as described in the following examples of FIGS. 4-9, the user may select a graphical object from the graphical object library 120 and place the graphical object on a graphical feature, such as one of the buildings 106, 108, or 110. In response, the projector interface 70 may generate the instructions INST for the laser projection system 56 to project a laser image corresponding to the placed graphical object onto the physical feature (e.g., one of the respective corresponding physical buildings) in the geographic region of interest.

Figure 5:
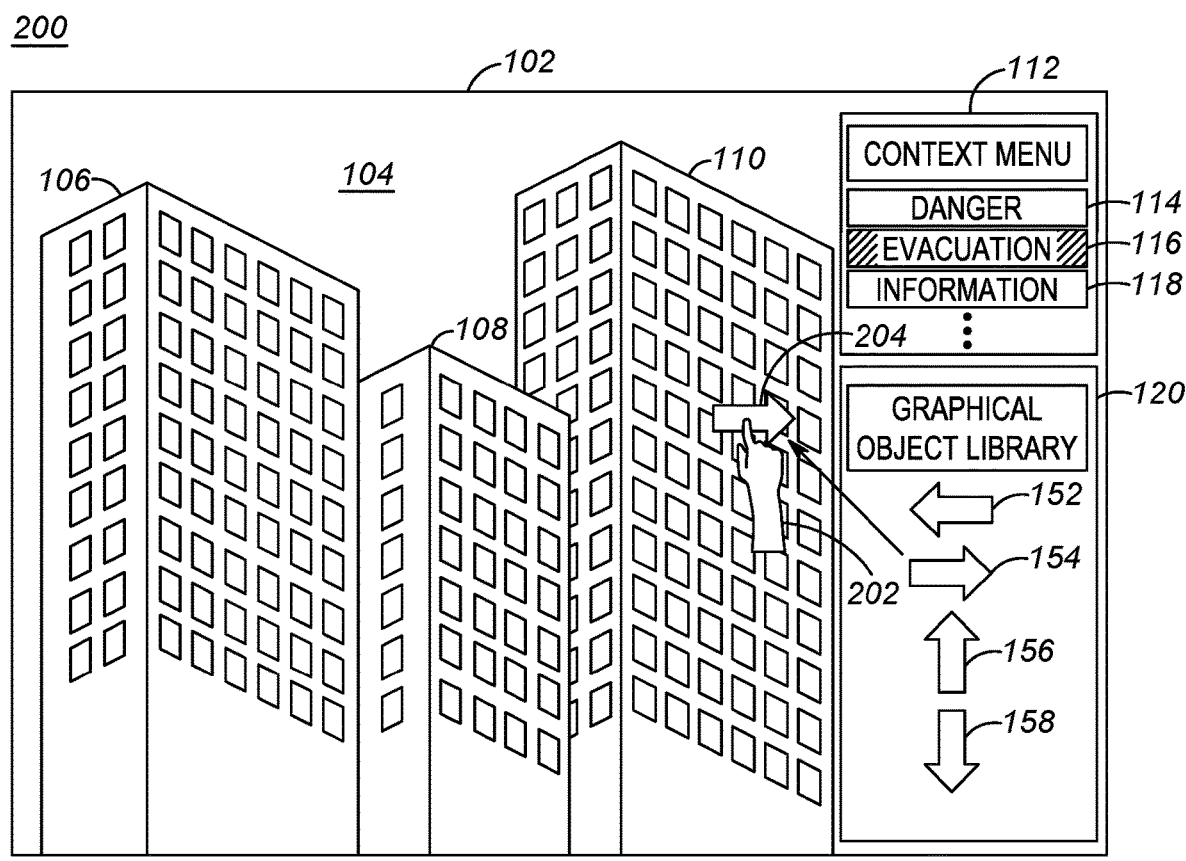
FIG. 5 illustrates yet another example of a virtual reality graphical user interface in accordance with some embodiments.

FIG. 5 illustrates yet another example diagram 200 of the virtual reality graphical user interface 102 in accordance with some embodiments. The diagram 200 demonstrates the user placing one of the graphical objects onto a graphical feature of the virtual reality space 104. In the example of FIG. 5, the user input is demonstrated as a hand 202 that has selected the right arrow 154 from the graphical object library 120. The user may thus perform a "click-and-drag" operation to select the right arrow 154, such that a right-arrow icon 204 is demonstrated as being moved by the hand 202 after the user selected the right arrow 154 from the graphical object library 120 and is moved onto the graphical feature of the virtual reality space 104, demonstrated as the graphical building 110. In addition, the user may also be able to perform additional gesture-type inputs with respect to positioning the respective graphical object (e.g., the right-arrow icon), such as zooming, rotating, changing color, or other types of ways to manipulate the graphical object for placement (e.g., based on pinching, wrist-rotation, or other types of gestures).

Figure 6:
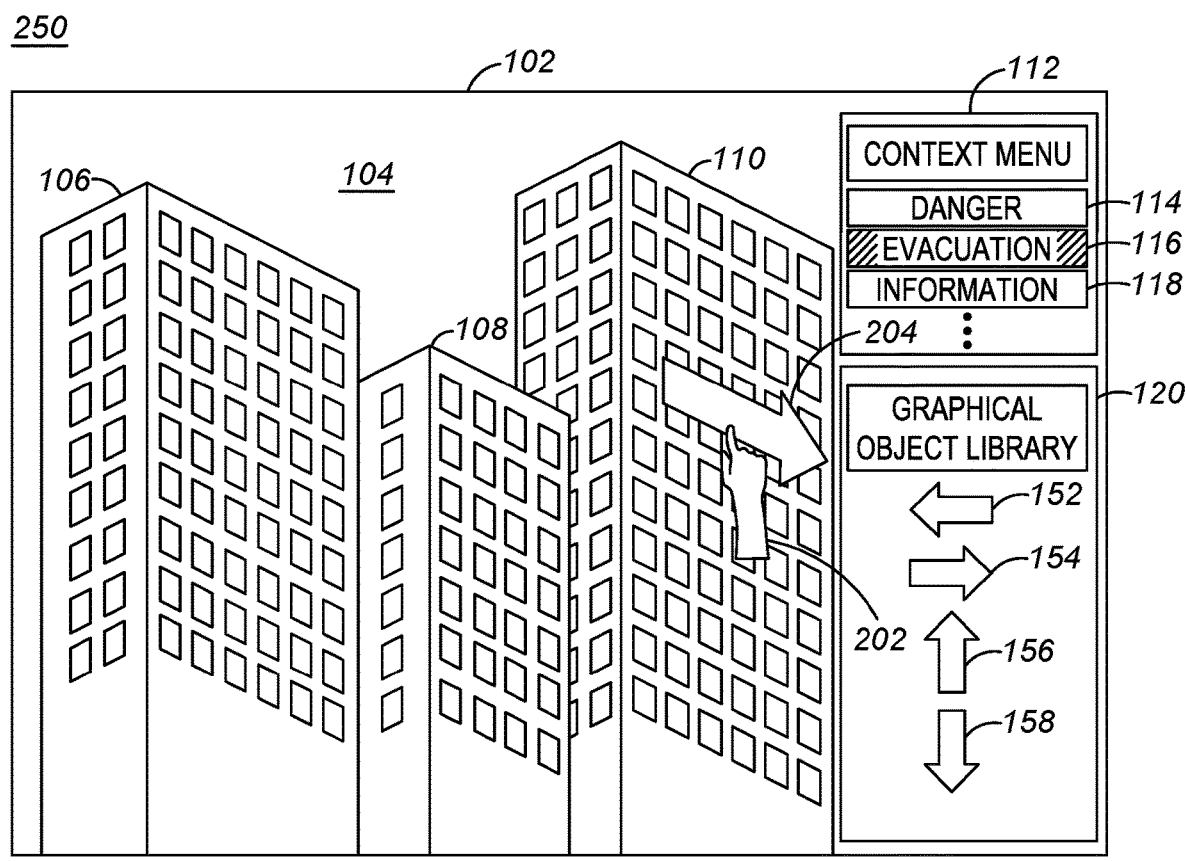
FIG. 6 illustrates yet a further example of a virtual reality graphical user interface in accordance with some embodiments.

FIG. 6 illustrates yet a further example diagram 250 of a virtual reality graphical user interface in accordance with some embodiments. The diagram 250 demonstrates the user having placed the right arrow icon 204 onto the graphical building 110. In response, the virtual reality graphical user interface 102 is configured to adjust the orientation of the right arrow icon 204 to correspond to the manner that a corresponding right arrow would appear if projected flat onto the surface of the building in the geographic region of interest corresponding to the graphical building 110 in the virtual reality space 104. For example, the positional data controller 72 may provide the positional relationship data PD corresponding to the position and orientation of the laser projection system 56 relative to the building in the geographic region of interest corresponding to the graphical building 110 in the virtual reality space 104. Therefore, the virtual reality graphical user interface 102 may orient the right arrow icon 204 to appear in the virtual reality space 104 as the projected image of the corresponding arrow would appear in the geographic region of interest.

Figure 7:
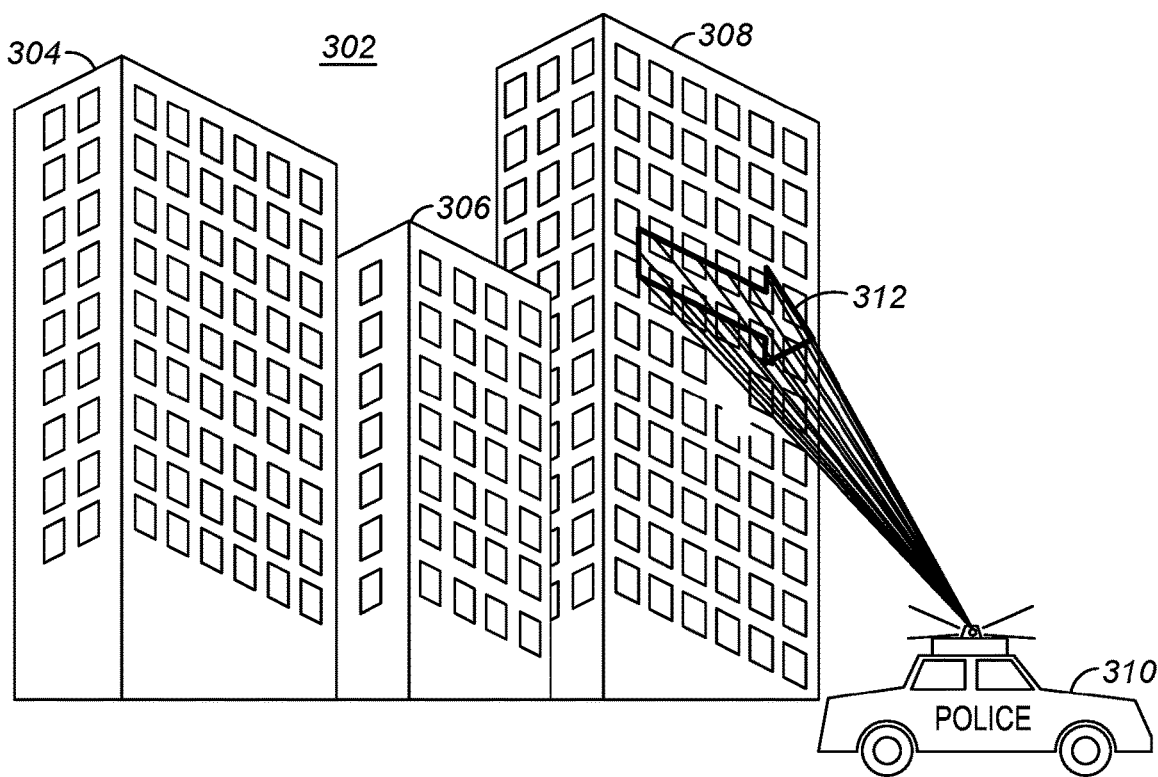
FIG. 7 illustrates an example of a diagram of providing public safety information in accordance with some embodiments.

FIG. 7 illustrates an example of a diagram 300 of providing public safety information in a geographic region of interest 302 in accordance with some embodiments. The geographic region of interest 302 may be displayed in the virtual reality space 104 by video capturing the geographic region of interest 302 by the camera interface system 54. In the example of FIG. 7, the geographic region of interest 302 is demonstrated as a set of three buildings 304, 306, and 308 that may correspond to the buildings 106, 108, and 110 in the virtual reality space 104. The geographic region of interest 302 also includes an emergency response vehicle 310 laser projecting a projected image 312 of a right arrow that may correspond to the right arrow icon 204 that was placed on the graphical building 110 in the virtual reality space 104. Therefore, in response to the placement of the right arrow icon 204 on the graphical building 110 in the virtual reality space 104 by the user, the display system 62 commands the projector interface 70 to generate instructions INST to project a corresponding image of a right arrow onto an identified projection surface in the building 308 of the geographic region of interest 302. Accordingly, in response to the placement of the right arrow icon 204 on the graphical building 110 in the virtual reality space 104 by the user, the display system 62 simulates collocation between the projected image 312 of the right arrow on the building 308 in the geographic region of interest 302 and the placed right arrow icon 204 on the graphical building 110 in the virtual reality space 104.

It is to be appreciated that the public safety information controller 58 may be configured to display multiple projections of the same or different graphical objects based on the same or different imaging platforms 52. For example, the public safety information system 50 may include a plurality of imaging platforms 52 and/or a plurality of virtual reality graphical user interfaces 64 to display one or more graphical objects onto one or more physical features onto a geographic region of interest. Therefore, the public safety information system 50 may be configured for a variety of different contexts and in a variety of different manners.

Figure 8:
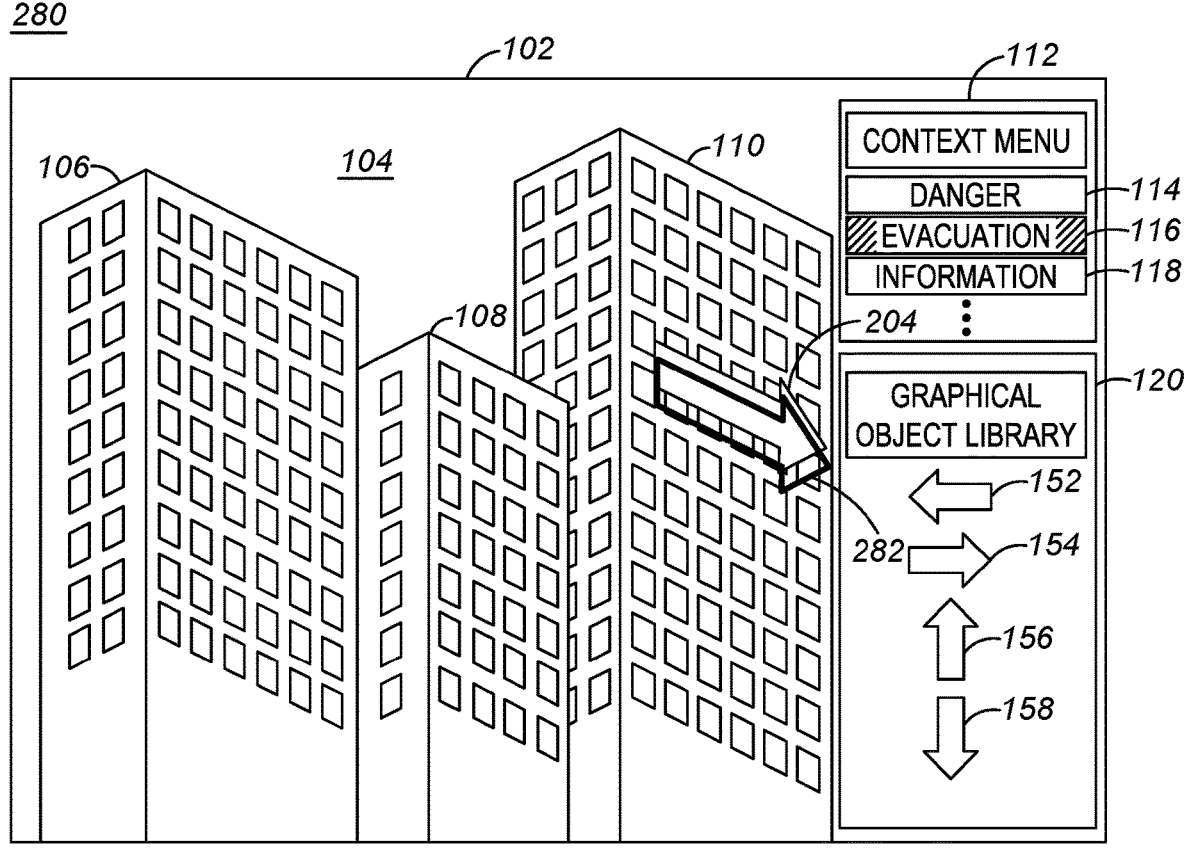
FIG. 8 illustrates still yet another example of a virtual reality graphical user interface in accordance with some embodiments.

FIG. 8 illustrates still yet another example diagram 280 of a virtual reality graphical user interface 102 in accordance with some embodiments. The diagram 280 shows the user having placed the right arrow icon 204 onto the graphical building 110, as illustrated in FIG. 6 and in response, the emergency response vehicle 310 laser projecting a projected image 312 of a right arrow that corresponds to the right arrow icon 204, as illustrated in FIG. 7.

In the diagram 280, it is presumed that the projected image 312 of the right arrow on the building 308 has changed positions (e.g., due to environmental variables, such as temperature and/or wind). In such a situation, the video image data VID of the geographic region of interest 302 captured by the camera interface system 54 reflects the change in position of the projected image 312 of the right arrow on the building 308. Accordingly, the video image data VID is fed back into the virtual reality rendering engine 60, and the virtual reality space 104 is updated in near real-time to reflect a change in position of the right arrow, indicated by the outline of the projected right arrow 282. Based on the presence of the outline of the projected right arrow 282, the virtual reality graphical user interface 102 can detect the change of position of the projected image 312.

In one example, in response to detecting the change of position, the virtual reality graphical user interface 102 may be configured to adjust the orientation of the outline of the projected right arrow 282 to re-align the right arrow icon 204 with the outline of the projected right arrow 282 to compensate for the change in position of the projected image 312. In another example, in response to detecting the change of position, the virtual reality graphical user interface 102 may be configured to adjust the orientation of the right arrow icon 204 to re-align with the outline of the projected right arrow 282 that reflects the change in position of the projected image 312. In yet another example, the virtual reality graphical user interface 102 may be configured to reposition both the right arrow icon 204 and the outline of the projected right arrow 282 at an average position (or some other position) to simulate collocation of the right arrow icon 204 and the outline of the projected right arrow 282.

Figure 9:
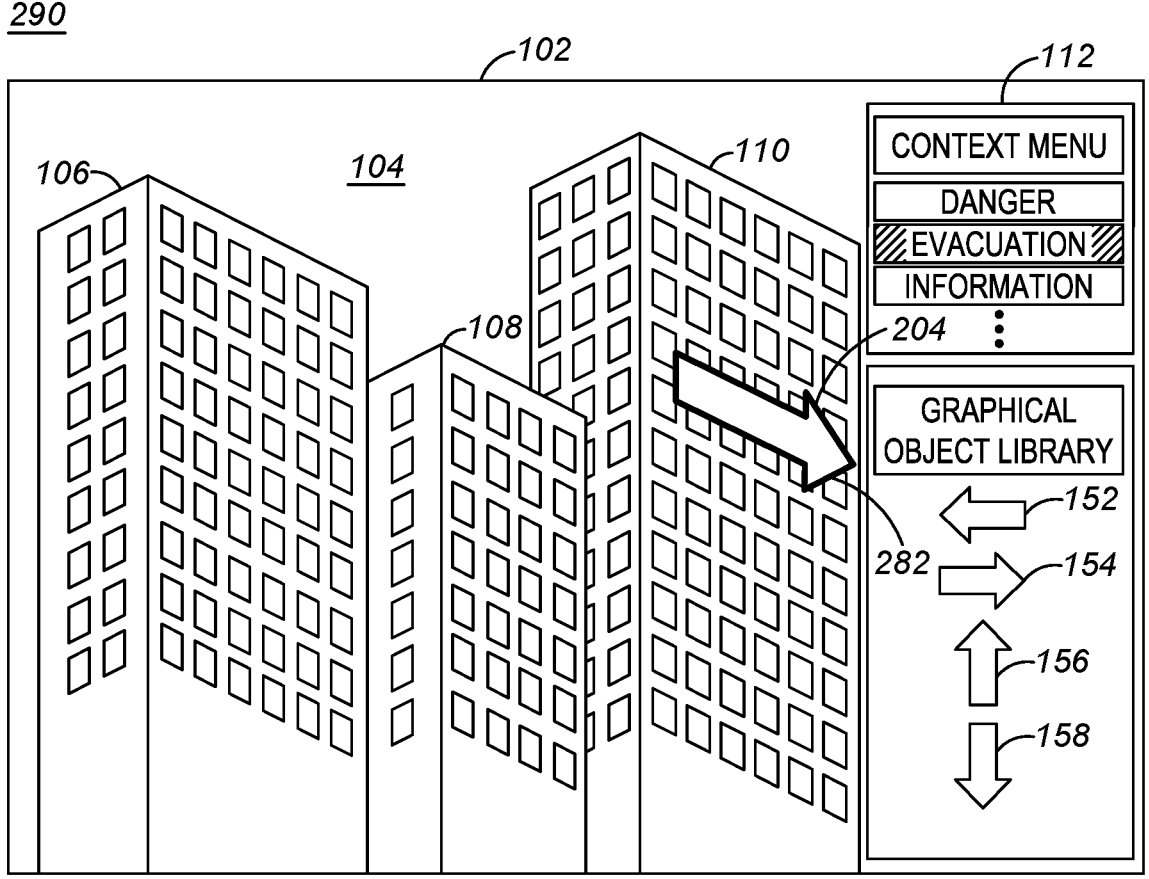
FIG. 9 illustrates still further yet another example of a virtual reality graphical user interface in accordance with some embodiments.

FIG. 9 illustrates still further yet another example diagram 290 of a virtual reality graphical user interface 102 in accordance with some embodiments. The diagram 290 shows the diagram 280 of the virtual reality space of FIG. 8 upon re-alignment of the outline of the projected right arrow 282 (corresponding to a projected image 312 that changes positions) onto the icon of the right arrow 204. In response to the realignment, the projector interface 70 identifies a repositioned projection surface in the building 308 and generates instructions INST for the laser projection system 56 to output (e.g., adjust and/or fine tune) the projected image 312 onto a repositioned projection surface in the building 308 to simulate collocation between the projected image 312 on the building 308 of the geographic region of interest and the graphical building 110 of the virtual reality space 104.

Figure 10:
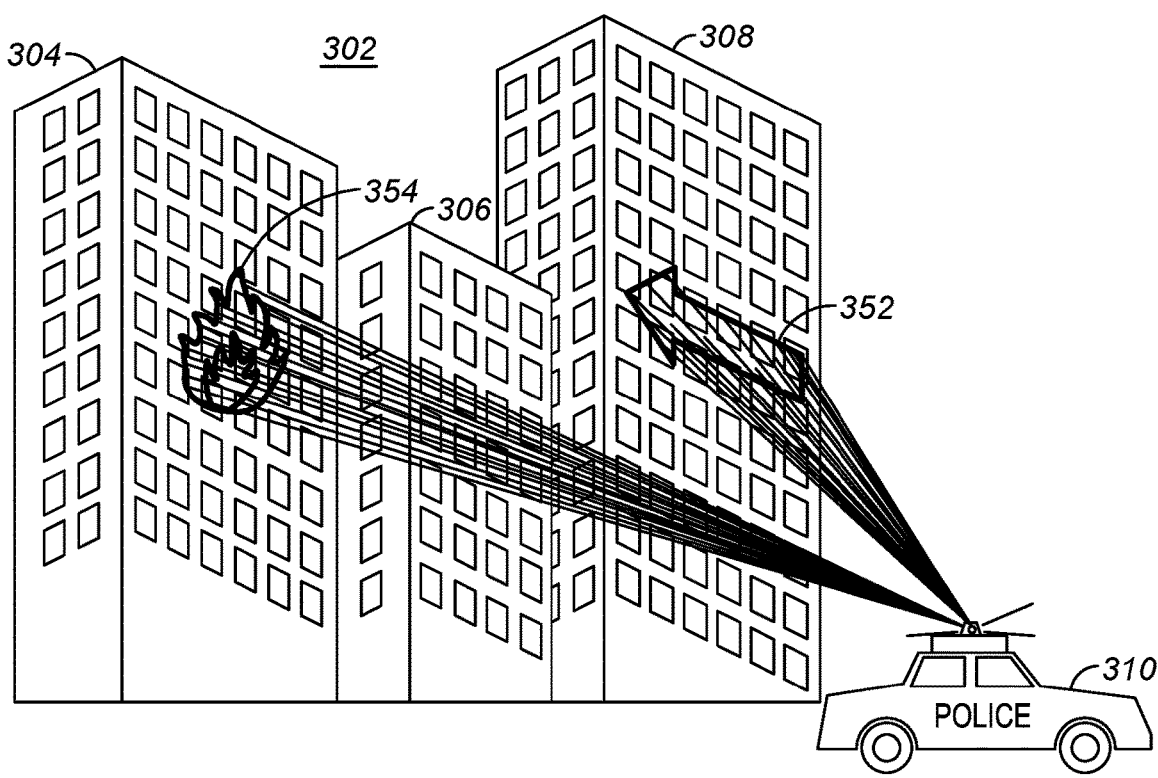
FIG. 10 illustrates another example of a diagram of providing public safety information in accordance with some embodiments.

FIG. 10 illustrates another example of a diagram 350 of providing public safety information in a geographic region of interest in accordance with some embodiments. The geographic region of interest 302 may be displayed in the virtual reality space 104 by video-capturing by the camera interface system 54. In the example of FIG. 10, the geographic region of interest 302 includes three buildings 304, 306, and 308 and the emergency response vehicle 310. In the diagram 350, the emergency response vehicle 310 is shown as laser projecting a first projected image 352 of a left arrow that may correspond to a user having selected and placed the left arrow 152 from the graphical object library 120 onto the graphical building 110 in the virtual reality space 104. The diagram 350 also demonstrates the emergency response vehicle 310 as laser projecting a second projected image 354 of a fire icon that may correspond to a user having selected and placed the fire 122 from the graphical object library 120 onto the graphical building 106 in the virtual reality space 104.

As an example, the emergency response vehicle 310 may include two separate laser projection systems 56 that are commanded separately by the projector interface 70, or by two separate respective projector interfaces, based on implementing user controls via the virtual reality graphical user interface 64 or via two separate respective virtual reality graphical user interfaces 64. Alternatively, a single projector may aggregate multiple graphical objects into a single projection by the projector interface 70. The projection of the first and second projected images 352 and 354 may be based, for example, on implementing separate contexts from the context menu 112, or separate graphical objects from the same graphical object library 120 associated with a given one context.

Accordingly, the public safety information system 50 may provide flexibility with providing public safety information. In the example of FIG. 10, the public safety information system 50 may project the first projected image 352 on the building 308 to indicate to firefighters a general direction of where to find a burning fire, and may project the second projected image 354 on the building 304 to indicate to the firefighters on which specific floor/location that the fire is burning. As a result, the firefighters may quickly and easily ascertain the emergency situation to allow the firefighters to more rapidly respond.

Figure 11:
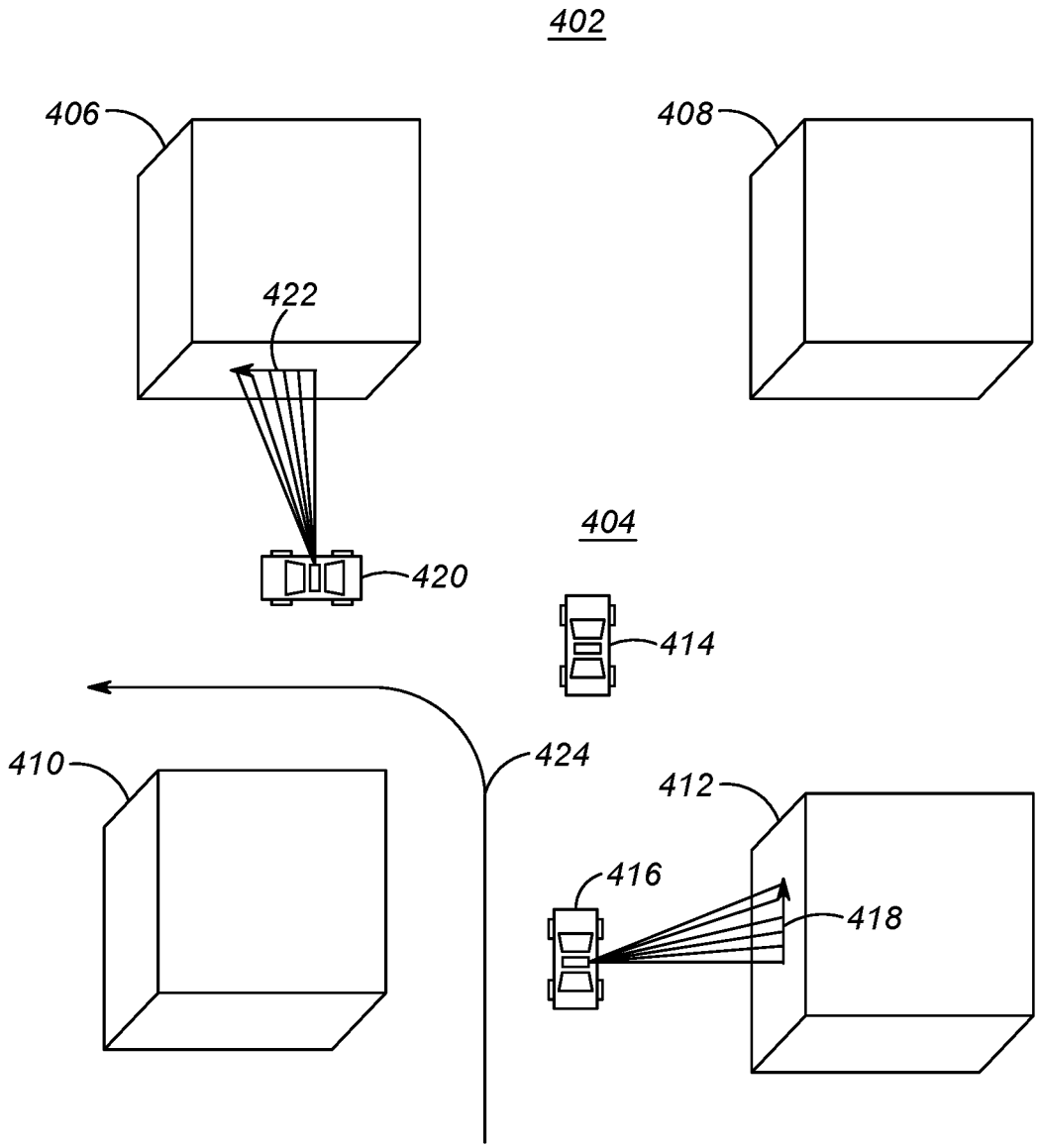
FIG. 11 illustrates yet another example of a diagram of providing public safety information in accordance with some embodiments.

FIG. 11 illustrates yet another example of a diagram 400 of providing public safety information in a geographic region of interest 402 in accordance with some embodiments. The geographic region of interest may be displayed in a virtual reality space by video-capturing by the camera interface system 54. The diagram 400 demonstrates the geographic region of interest 402 in a top plan view to demonstrate an intersection 404 of a city block that includes buildings 406, 408, 410, and 412. In the diagram 400, a first emergency response vehicle 414 is located in the intersection 404 of the city block. As an example, the first emergency response vehicle 414 may include the camera interface system 54 that is configured to capture the video image data of the intersection 404 of the city block, including the features corresponding to the buildings 406, 408, 410, and 412. The diagram 400 also includes a second emergency response vehicle 416 that is laser projecting a first projected image 418 corresponding to a left arrow on the building 412, and a third emergency response vehicle 420 that is laser projecting a second projected image 422 corresponding to a left arrow on the building 406.

As an example, the emergency response vehicles 416 and 420 may each include a laser projection system 56 that is commanded by a common projector interface 70, or by two separate respective projector interfaces (such as located in the first emergency response vehicle 414 or a dispatch center). Therefore, a common user may implement user controls via a virtual reality graphical user interface 64 or via two separate respective virtual reality graphical user interfaces to separately command projection of the first and second projected images 418 and 422. As yet another example, the first emergency response vehicle 414 may include multiple camera interface systems, such as associated with projection of each of the first and second projected images 418 and 422 via the respective second and third emergency response vehicles 416 and 420. As yet a further example, multiple additional camera interface systems that are disparately located (e.g., via different emergency response vehicles) may be implemented to gather video image data of different portions of the geographic region of interest, such as to capture video image data of portions of the geographic region of interest that are not able to be captured by a single camera interface system. Therefore, in these examples, the video image data may be integrated via one or more virtual reality rendering engines to generate a single virtual reality space that may facilitate user interaction from one or more separate display systems, such as from each of the second and third emergency response vehicles 416 and 420.

Accordingly, the public safety information system 50 may provide flexibility with providing public safety information via multiple emergency response vehicles or imaging platforms 52. In the example of FIG. 11, the public safety information system 50 may implement projection of the first projected image 418 on the building 412 and the second projected image 422 on the building 406 to indicate to people or emergency responders to travel in a general direction indicated by the arrow 424, such as to evacuate the area. As a result, people or emergency responders may quickly and easily ascertain the direction to travel in a safe and prudent manner.

Figure 12:
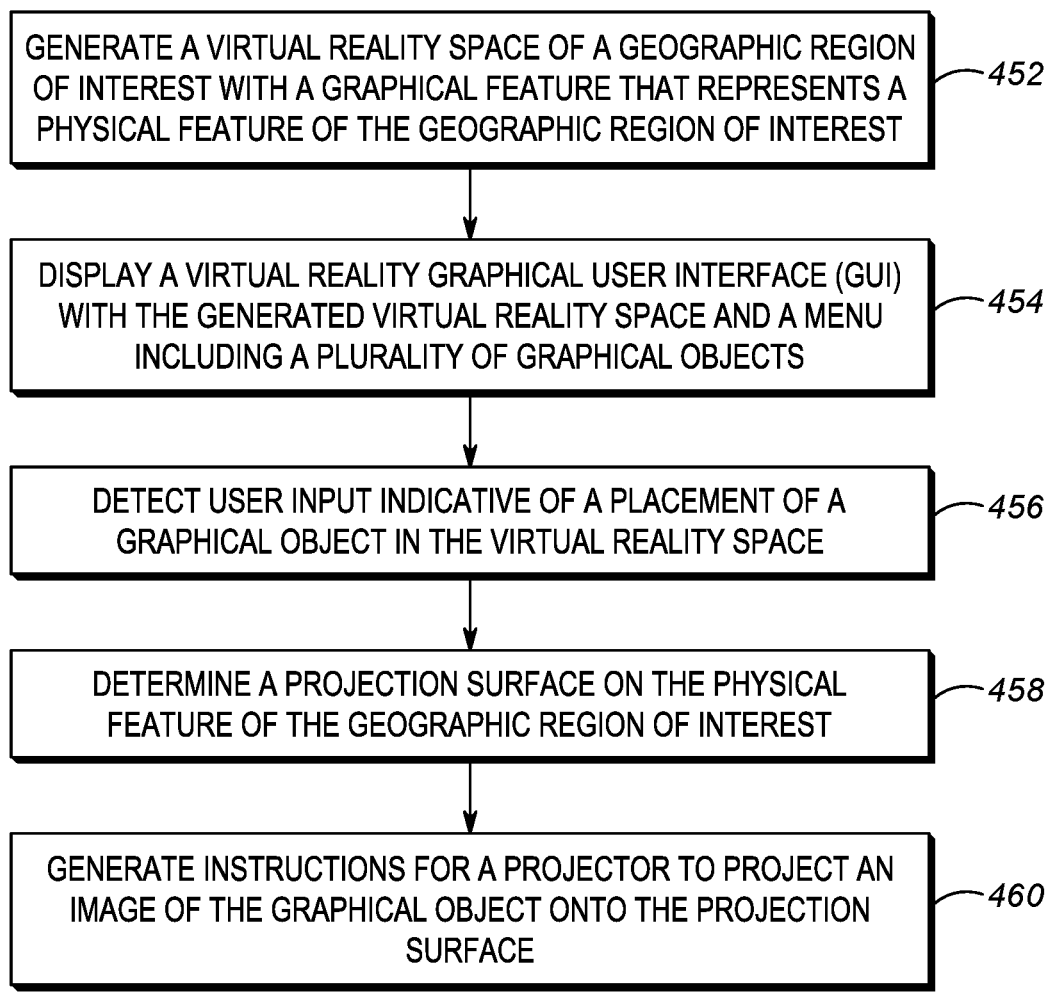
FIG. 12 illustrates an example of a method for providing public safety information in accordance with some embodiments.

In view of the foregoing structural and functional features described above, a method in accordance with various aspects of the present disclosure will be better appreciated with reference to FIG. 12. While, for purposes of simplicity of explanation, the method of FIG. 12 is shown and described as executing serially, it is to be understood and appreciated that the present disclosure is not limited by the illustrated order, as some aspects could, in accordance with the present disclosure, occur in different orders and/or concurrently with other aspects from that shown and described herein. Moreover, not all illustrated features may be required to implement a method in accordance with an aspect of the present disclosure.

FIG. 12 illustrates a method 450 for providing safety information in accordance with some embodiments. At 452, a virtual reality space (e.g., the virtual reality space 14) of a geographic region of interest (e.g., the geographic region of interest 302) with a graphical feature (e.g., the graphical building 110) that represents a physical feature (e.g., the building 308) of the geographic region of interest is generated via a virtual reality rendering engine (e.g., the virtual reality rendering engine 12). At 454, a virtual reality graphical user interface (e.g., the graphical user interface 18) with the generated virtual reality space and a menu (e.g., the graphical object library 120) including a plurality of graphical objects (e.g., the graphical objects 122, 124, 126) is displayed via a display (e.g., the display system 16). At 456, a user input indicative of a placement of a graphical object (e.g., the arrow 204) in the virtual reality space is detected via the virtual reality graphical user interface by the electronic processor 65. At 458, a projection surface on the physical feature of the geographic region of interest based on the placement of the graphical object in the virtual reality space is determined by the projector interface 70. In one embodiment, the projector interface 70 identifies coordinates in the virtual reality space corresponding to the placement of the graphical object, determines projection coordinates on the physical feature of the geographic region of interest corresponding to the identified coordinates in the virtual reality space, and identifies a surface on the physical feature by mapping the determined projection coordinates to the physical feature. Further, the projector interface 70 determines whether the identified surface violates a projection rule that defines at least one of surfaces permissible for the projection of at least one of the graphical objects. If the identified surface does not violate the projection rule, the projector interface 70 selects the identified surface as the projection surface, otherwise the projector interface 70 selects a different surface on the physical feature that does not violate the projection rule.

Next at 460, instructions for a projector (e.g., the laser projection system 56) to project an image (e.g., the projected image 312) of the placed graphical object on the physical feature is generated via a projector interface (e.g., the projector interface 20) to simulate collocation between the projected image on the physical feature in the geographic region of interest and the placed graphical object on the graphical feature in the virtual reality space. In one embodiment, the projector interface 70 generates instructions that include projection parameters that are determined based on at least one of a present environmental state associated with the geographic region of interest, texture of the identified projection surface, and layout of the identified projection surface. In one embodiment, the projection parameters are determined further based on the positional relationship data associated with the projector relative to the projection surface to provide a predetermined orientation of the projected image on the projection surface irrespective of a position of the projector relative to the projector surface. In one embodiment, the projector interface 70 identifies one other projection surface on the physical feature of the geographic region of interest based on the placement of the at least one of the graphical objects in the virtual reality space and generates instructions for at least one other projector (placed in a disparate location) to project the placed graphical object on the one other projection surface in the physical feature of the geographic region of interest.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method for projecting graphical objects, the method comprising:
    generating a virtual reality space of a geographic region of interest, the virtual reality space including a graphical feature representing a physical feature of the geographic region of interest, wherein the physical feature corresponds to a real-word structure onto which a real image of a graphical object is to be projected to provide a visual of the graphical object to people occupying the geographic region of interest;
    displaying a virtual reality graphical user interface (GUI) including the generated virtual reality space and a menu having a plurality of graphical objects;
    detecting a user input indicative of a placement of at least one of the graphical objects in the virtual reality space;
    determining a projection surface on the physical feature of the geographic region of interest based on the placement of the at least one of the graphical objects in the virtual reality space, wherein the projection surface corresponds to a real-world surface that is in physical contact with at least a portion of the physical feature of the geographic region of interest; and
    generating instructions for a projector to project a real image of the at least one of the graphical objects onto the projection surface in the physical feature of the geographic region of interest for simulating collocation between the projected image on the physical feature in the geographic region of interest and the placed graphical object on the graphical feature in the virtual reality space, wherein the real image is visible to people occupying the geographic region of interest.

2. The method of claim 1, wherein displaying the virtual reality GUI comprises:
    receiving context data associated with a public safety context;
    selecting graphical objects corresponding to the context data; and
    displaying the virtual reality GUI including the generated virtual reality space and the menu having the selected graphical objects.

3. The method of claim 1, further comprising:
    displaying a plurality of public safety contexts;
    detecting a user input indicative of a selection of one of the plurality of public safety contexts; and
    filtering the menu to include graphical objects corresponding to the selected public safety context.

4. The method of claim 1, wherein determining the projection surface comprises:
    identifying coordinates in the virtual reality space corresponding to the placement of the least one of the graphical objects;
    determining projection coordinates on the real-world surface that is in physical contact with at least the portion of the physical feature of the geographic region of interest corresponding to the identified coordinates in the virtual reality space; and
    identifying a surface on the physical feature of the geographic region of interest by mapping the determined projection coordinates to the physical feature.

5. The method of claim 4, further comprising:
    determining whether the identified surface violates a projection rule defining at least one of surfaces permissible for the projection of the at least one of the graphical objects; and
    selecting the surface as the projection surface when the identified surface does not violate the projection rule.

6. The method of claim 5, further comprising:
    identifying a different surface on the physical feature that does not violate the projection rule, when the identified surface violates the projection rule;
    displaying the at least one of the graphical objects at the different surface corresponding to a suggested repositioning location in the virtual reality space that does not violate the projection rule; and receiving a user input accepting the suggested repositioning location as the placement of the graphical object, and responsively generating instructions for the projector to project the real image of the at least one of the graphical objects onto the different surface in the physical feature of the geographic region of interest.

7. The method of claim 1, wherein generating the virtual reality space comprises:
obtaining three-dimensional (3D) virtual rendering data corresponding to the physical feature of the geographic region of interest; and
generating the virtual reality space based in part on the three-dimensional virtual rendering data.

8. The method of claim 1, wherein the instructions for the projector include projection parameters that are determined based on at least one of a present environmental state indicating at least one of weather, temperature, and ambient light associated with the geographic region of interest, texture of the projection surface, and layout of the projection surface.

9. The method of claim 1, wherein the instructions further include projection parameters that are determined based on a positional relationship data associated with the projector relative to the projection surface to provide a predetermined orientation of the projected image on the projection surface irrespective of a position of the projector relative to the projection surface.

10. The method of claim 1, further comprising:
identifying one other projection surface on the physical feature of the geographic region of interest based on the placement of the at least one of the graphical objects in the graphical feature; and
generating instructions for at least one other projector to project the at least one of the graphical objects onto the one other projection surface in the physical feature of the geographic region of interest, wherein the projector and the at least one other projector are at disparate locations.

11. A system for projecting graphical objects, the system comprising:
a virtual reality (VR) rendering engine configured to generate a virtual reality space of a geographic region of interest, the virtual reality space including a graphical feature that represents a physical feature of the geographic region of interest, wherein the physical feature corresponds to a real-world structure onto which a real image of a graphical object is to be projected to provide a visual of the graphical object to people occupying the geographic region of interest;
a display system comprising an electronic processor and a display, the display system coupled to the VR rendering engine, wherein
the display is configured to display a virtual reality graphical user interface (GUI) including the generated virtual reality space and a menu having a plurality of graphical objects, and
the electronic processor is configured to detect a user input indicative of a placement of at least one of the graphical objects in the virtual reality space; and
a projector interface coupled to the display system, the projector interface configured to
determine a projection surface on the physical feature of the geographic region of interest based on the placement of the at least one of the graphical objects in the virtual reality space, wherein the projection surface corresponds to a real-world surface that is in physical contact with at least a portion of the physical feature of the geographic region of interest, and
generate instructions for a projector to project a real image of the at least one of the graphical objects onto the projection surface in the physical feature of the geographic region of interest for simulating collocation between the projected image on the physical feature in the geographic region of interest and the placed graphical object on the graphical feature in the virtual reality space, wherein the real image is visible to people occupying the geographic region of interest.

12. The system of claim 11, further comprising a camera interface configured to generate image data of the geographic region of interest, and wherein the VR rendering engine generates the virtual reality space based in part on the image data.

13. The system of claim 11, further comprising a depth camera interface configured to generate a three-dimensional (3D) image data of the geographic region of interest, and further wherein the VR rendering engine generates the virtual reality space based in part on the 3D image data.

14. The system of claim 11, wherein the display is configured to:
receive context data associated with a public safety context; and
display the menu having graphical objects corresponding to the public safety context.

15. The system of claim 11, wherein the virtual reality GUI further includes a plurality of public safety contexts, and in response to a user input selecting one of the plurality of public safety contexts, the virtual GUI filters the menu to include graphical objects corresponding to the selected public safety context.

16. The system of claim 11, wherein the projector interface is further configured to:
identify coordinates in the virtual reality space corresponding to the placement of the at least one of the graphical objects;
determine projection coordinates on the real-world surface that is in physical contact with at least the portion of the physical feature of the geographic region of interest corresponding to the identified coordinates in the virtual reality space;
identify a surface on the physical feature of the geographic region of interest by mapping the determined projection coordinates to the physical feature; and
select the surface as the projection surface based on a determination that the identified surface does not violate a projection rule defining at least one of surfaces permissible for the projection of the at least one of the graphical objects.

17. The system of claim 11, wherein the display is configured as a user-wearable virtual reality interface and display system.

18. The system of claim 11, wherein the virtual reality rendering engine is configured to generate the virtual reality space of the geographic region of interest based on video image data that is generated via a plurality of camera interfaces that are located at a respective plurality of disparate locations, wherein the virtual reality rendering engine is configured to integrate the video image data generated via the plurality of camera interfaces to generate the virtual reality space.

* * * * *